No. 746,575. PATENTED DEC. 8, 1903.
A. REED.
COLLAR FASTENER.
APPLICATION FILED AUG. 6, 1903.
NO MODEL.

Witnesses
E. K. Reichenbach.

Inventor
Adam Reed.
By H. B. Wilson.
Attorney

No. 746,575.                                             Patented December 8, 1903.

UNITED STATES PATENT OFFICE.

ADAM REED, OF MIDDLETOWN, DELAWARE.

COLLAR-FASTENER.

SPECIFICATION forming part of Letters Patent No. 746,575, dated December 8, 1903.

Application filed August 6, 1903. Serial No. 168,499. (No model.)

*To all whom it may concern:*

Be it known that I, ADAM REED, a citizen of the United States, residing at Middletown, in the county of Newcastle and State of Delaware, have invented certain new and useful Improvements in Collar-Fasteners; and I do declare the following to be a full, clear, and exact description of the invention, such as will enable others skilled in the art to which it appertains to make and use the same.

This invention relates to improvements in horse-collar fasteners.

The object of the invention is to provide a fastener of the loop-and-lever type which will enable the use of short inextensible straps, and thus effect a saving in stock and longer wear, while permitting of the necessary adjustment to secure a proper fastening of the collar, and, further, to provide means for preventing disconnection of the harness from the collar, thus enabling as secure a connection of the harness on the collar to be obtained with a flat-top collar as with a peaked-rim collar, doing away with the necessity of employing the latter, and thereby saving in the cost of manufacture of the collar and giving greater comfort to the animal.

Figure 1:
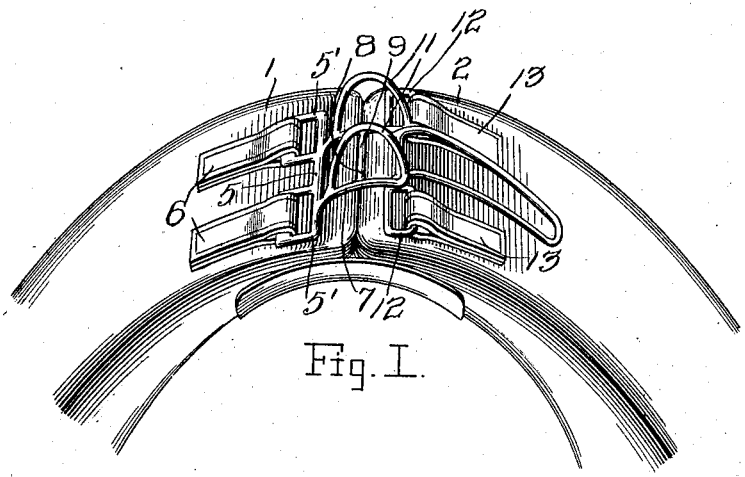
Figure 2:
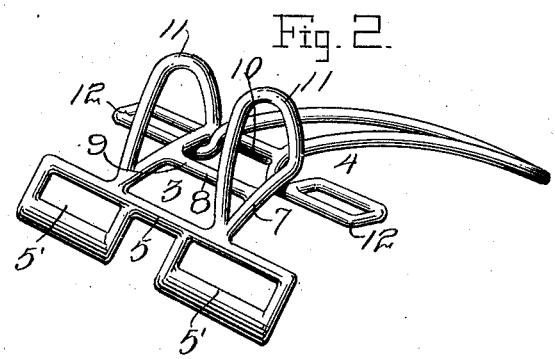
Figure 3:
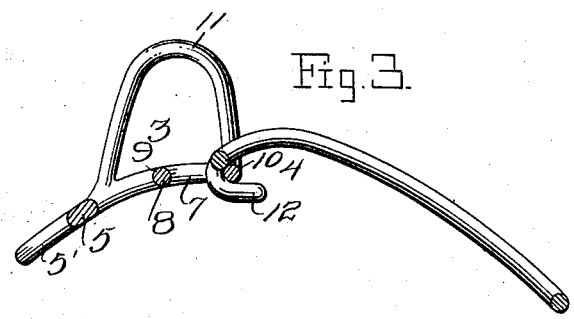

In the accompanying drawings, Figure 1 is a perspective view of the upper portion of a horse-collar equipped with my improved fastener. Fig. 2 is a perspective view of the coupled fastener detached; and Fig. 3 is a vertical section through the fastener, taken on a line through the hame-retainers.

In the drawings, 1 and 2 denote the ends of the collar, and 3 and 4 the loop-frame and lever of the fastener. The frame 3 comprises a transverse bar 5, at the ends of which are formed guide-loops 5' for the straps 6, which secure it to the end 1 of the collar. From one side of the bar 5 extends a coupling portion consisting of a U-shaped piece 7, whose sides are connected by a cross-piece 8, extending parallel with the bar 5, thus forming a pair of loops 9 and 10. From the sides of the piece 7 rise arms 11, which may be in form of loops, as shown, or simple studs and which are designed to receive the hame-coupling between them, and thus act as retainers to prevent the coupling and hames from moving out of position. By this means a flat-top collar may be used without liability of the hames becoming disconnected. This avoids the necessity of using a peaked rim, which is more expensive of construction and of less comfort to the animal.

The lever member 4 of the fastener is curved, as usual, and has laterally-projecting loop-arms 12, receiving straps 13 on the collar end 2. The said lever member is adapted to be projected up through either loop 9 or 10 and turned down over the top of the outer end of the U-piece 7 to couple with the frame 3, and thereby connect the ends of the collar together. This adjustable connection afforded by the provision of the loops 9 and 10 enables me to also make the strap 13 short and inextensible, doing away with buckles and avoiding the wear consequent upon the adjustment of extensible straps, thereby effecting an initial saving in the cost of stock and a later saving in the way of repairs to the purchaser and user of the collar.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

A collar-fastener comprising a loop-frame formed of a cross-bar provided with spaced end strap-loops arranged wholly upon one side thereof, a U-shaped coupling-piece joined at its open side to the opposite side of the cross-bar on a line between the centers of said loops, the said parts being segmentally curved, arched stops rising from the sides of the coupling-piece and bracing the extremities thereof at their junction with said cross-bar and the outer cross-bar of the coupling, and a division-bar extending parallel with the said cross-bars and connecting the arms or sides of the coupling-piece intermediate of the length of the same and midway between the arms of the arched stops, thus forming receiving-loops and bracing the sides of the coupling and the stops against spreading, and a coupling-lever adapted to pass through either of said loops and consisting of a looped frame having a cross-piece adapted to abut against the outer or division cross-bar of the loop, curved forwardly to take beneath either of said cross-bars, and having forwardly and laterally extending strap-loops, substantially as described.

In testimony whereof I have hereunto set my hand in presence of two subscribing witnesses.

ADAM REED.

Witnesses:
   ALFRED G. COX,
   TALBERT WILLIAMS.